United States Patent [19]

Weber

[11] Patent Number: 5,384,939

[45] Date of Patent: Jan. 31, 1995

[54] FIXING ELEMENT FOR HOLDING A MAT

[75] Inventor: Wilfried Weber, Schopfloch-Unteriflingen, Germany

[73] Assignee: fischerwerke Artur Fischer GmbH & Co. KG, Tumlingen, Germany

[21] Appl. No.: 14,386

[22] Filed: Feb. 5, 1993

[30] Foreign Application Priority Data

Feb. 14, 1992 [DE] Germany ............... 4204410

[51] Int. Cl.6 ............................................. A44B 21/00
[52] U.S. Cl. ................................. 24/306; 24/444;
411/426; 411/531
[58] Field of Search ............... 24/306, 444, 452, 449,
24/442, 351, 297, 453; 411/307, 426, 531

[56] References Cited

U.S. PATENT DOCUMENTS

| 3,135,820 | 6/1964 | Hallett, Jr. et al. ............ 24/306 |
| 4,290,174 | 9/1981 | Kalleberg ..................... 24/444 |
| 4,531,733 | 7/1985 | Hall .......................... 24/297 |
| 5,212,853 | 5/1993 | Kaneko ....................... 24/306 |

FOREIGN PATENT DOCUMENTS

| 58252 | 8/1982 | European Pat. Off. ........... 411/426 |
| 292892 | 11/1988 | European Pat. Off. ........... 24/453 |
| 8512745 | 7/1985 | Germany . |
| 3934462 | 12/1990 | Germany . |
| 9115861 | 4/1992 | Germany . |
| 9200632 | 6/1992 | Germany . |
| 53007 | 10/1988 | Japan ......................... 24/453 |
| 13630 | 1/1990 | Japan ......................... 411/307 |
| 2190130 | 11/1987 | United Kingdom .............. 24/453 |
| 372786 | 3/1973 | U.S.S.R. . |

Primary Examiner—Edward K. Look
Assistant Examiner—James A. Larson
Attorney, Agent, or Firm—Michael J. Striker

[57] ABSTRACT

The fixing element for fixing a mat to a floor part in a vehicle consists of a bottom part anchorable to the floor part to which the mat is to be secured and a top part having a clamping device and securable to the mat via the clamping device. The top part and the bottom part each have a disk-shaped flange with a coupling face. The coupling faces of the disk-shaped flanges face each other and have a plurality of identical coupling elements which cooperate by interlocking when the top part engages the bottom part. The coupling elements can be rows of pins having heads. The heads of the pins on the top part engage with those on the bottom part when the top part engages with the bottom part.

11 Claims, 1 Drawing Sheet

FIXING ELEMENT FOR HOLDING A MAT

BACKGROUND OF THE INVENTION

The present invention relates to a fixing element for holding a mat, especially a floor mat in a vehicle.

Fixing elements of this type are known consisting of a bottom part anchorable in a mat support and a top part releasably joined to the bottom part. The top part is joined to the mat by a clamping device.

To hold a floor mat in a vehicle, a fixing element is known which is screwed through the mat on a portion of the vehicle floor covered with a rigid expanded plastic material. To remove the mat, for example, for cleaning the vehicle floor, the fixing element must always be unscrewed from the floor and screwed to the floor again later. Frequent screwing and unscrewing can damage the threaded bore in the floor so extent that the mat is no longer held to the floor securely. Furthermore finding the threaded bore, in particular when the mat has also been pulled out of shape, may be very difficult. If the mat has been pulled out of shape, it may also be impossible for the mat to be fixed without forming wrinkles.

For the releasable connection of parts, cling-type and Velcro fasteners are known. Because this type of closure generally consists of textile fibers, the Velcro fasteners must be in strip form and must be flat when applied to the parts to be joined. The strip can be sewn or glued to the two parts to be joined. Furthermore this cling-type closure is liable to be easily soiled and is not therefore suitable for fixing floor mats in vehicles.

SUMMARY OF INVENTION

It is an object of the present invention to provide a fixing element for holding a floor mat, especially a floor mat in a vehicle, which is reliable and strong, unaffected by dirt and allows the mat to be detached and re-fixed to the floor frequently.

According to the invention the fixing element comprises a bottom part anchorable in a mat support, e.g. a floor part, to which a mat is to be secured and a top part secured in the mat via a clamping device. The top part and the bottom part each comprise a disk-shaped flange having a coupling face. The coupling faces of the disk-shaped flanges face each other and their coupling faces each have a plurality of identical coupling elements which cooperate by interlocking when the top part engages the bottom part to secure the mat to the mat support. Advantageously the coupling elements are pins projecting beyond the coupling face and having radially extending round heads.

The top and bottom parts of the fixing element can advantageously be installed separately. The bottom part is anchored to the mat support of the vehicle and the top part is fixed by the clamping device to the mat. By pressing together the two coupling faces of the top and bottom parts, the coupling elements arranged on both faces engage one another and effect a joining and holding of the mat to the surface of the mat support. Because a plurality of coupling elements is arranged on the coupling faces, a satisfactory joining is guaranteed even when the two coupling faces do not coincide exactly one on top of the other. It is therefore always possible for the mat to be fixed without forming wrinkles.

To remove the mat, the top part and bottom parts are pulled apart, the bottom part inserted in the floor remaining anchored in the mat support. Anchoring of the bottom part just once insures, first, that the anchoring strength is consistently comparatively great and, second, that release of the mat is considerably simpler.

Both the bottom part and the top part of the fixing element with their coupling faces and coupling elements are produced from one piece in an injection-molding process, the coupling elements being constructed advantageously as pins. In an arrangement integrated, for example, in the injection-molding tool in a change-over station, the pin heads are formed with a heated forming punch. The coupling elements formed integrally with the coupling faces are therefore very strong and can be designed to meet the particular requirements of an individual application by controlling the thickness of the coupling elements and size of the heads.

To facilitate engaging the coupling elements with each other, it is expedient to arrange the coupling elements in pairs of parallel lines. The lines of each pair are spaced apart a distance equal to the width of a pin head, while adjacent pairs of lines of pins are spaced apart a distance corresponding approximately to twice the width of the pin head.

In a preferred embodiment of the invention the bottom part is provided with a shank which has a thread with a pitch increasing towards the coupling flange. To screw the bottom part into the mat support, a hexagon socket is provided in the center of the coupling flange of the bottom part. To guarantee a satisfactory alignment of the two parts during attachment of the mat to the mat support, the flange of the top part can have a larger diameter than the flange of the bottom part.

In another embodiment of the invention the top part is joined to the mat advantageously with a clamping device. The clamping device comprises a sleeve shaped extension of the top part arranged centrally on the top part and having a circumferential inner rib in the vicinity of its end face. A clamping member for the mat is pressed into this extension with a locking peg provided with external ribs. Using this clamping device it is possible to use the same fixing element for different mats having different thicknesses.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENT

Figure 1:
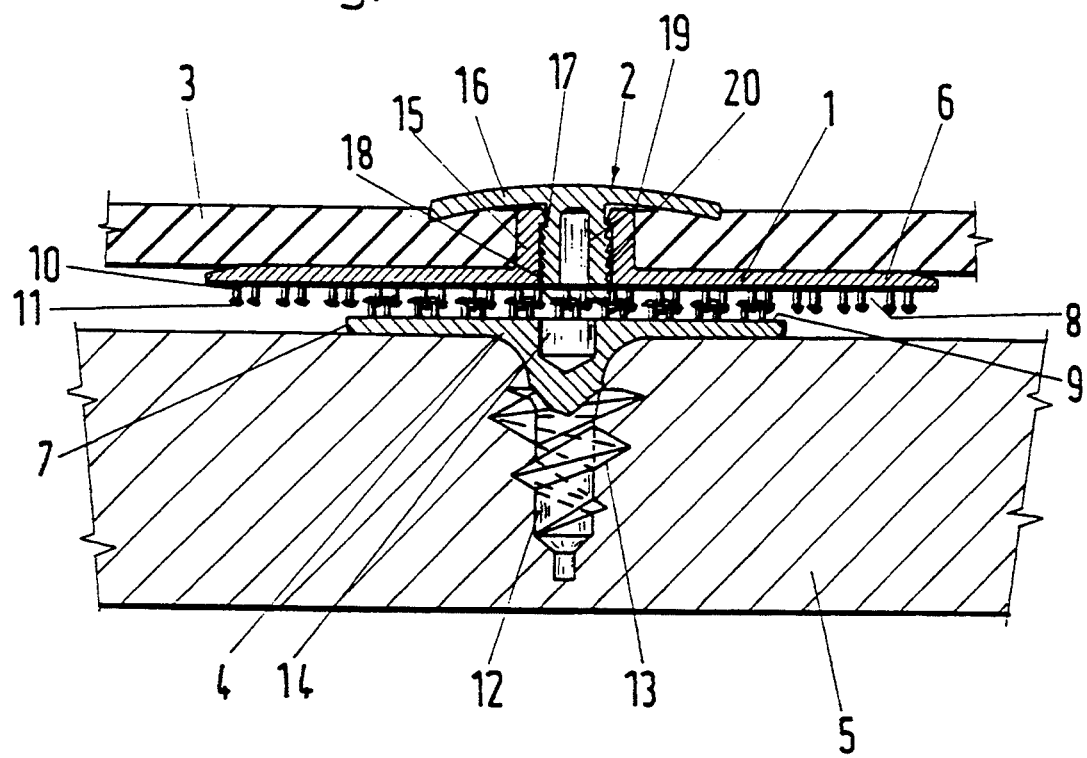
FIG. 1 is a cross-sectional view through a fixing element according to the invention consisting of a top part and a bottom part joined together to secure a mat to a floor part.
Figure 2:
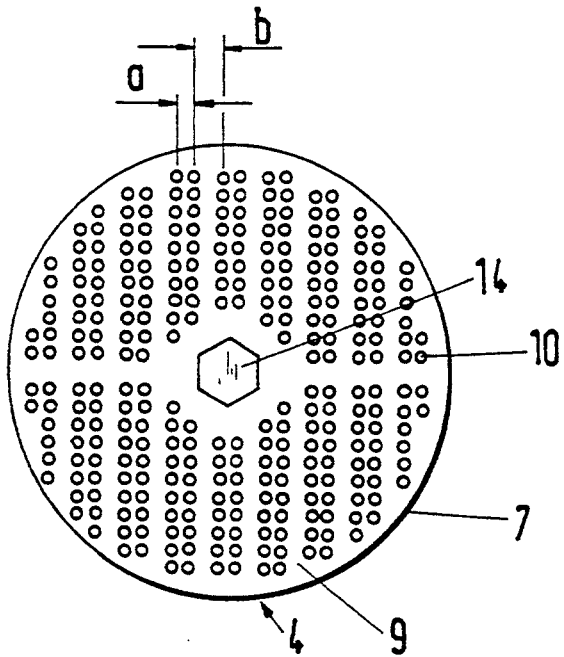
FIG. 2 is a plan view of a coupling face of the bottom part of the fixing element of FIG. 1.

The fixing element consists of a top part 1, which is joined with a clamping device 2 to a mat 3, and a bottom part 4, which is anchored to the floor part 5, which is for example the mat support in a vehicle. Each of the top and bottom parts 1,4 is provided with a respective disk-shaped flange 6,7, the coupling faces 8,9 of which face towards each other when the top and bottom parts are secured to the mat 3 and the floor part 5 respectively. Each of the coupling faces 8,9 is provided with coupling elements 10. In the embodiment described here the coupling elements are pins, each of which have a round pin head 11 which extends radially beyond the shaft of the pin on all sides.

The shank 12 of the bottom part 4 is provided with a large-area thread 13 for screwing into the floor part 5 and is made of rigid plastic material. To achieve comparatively greater holding values, the thread pitch increases towards the flange 7 of the bottom part 4. A hexagon socket 14 is provided in the center of the flange 7 for screwing in the bottom part 4.

To join the top part 1 to the mat 3, a sleeve-shaped extension 15 on the rear side of the flange 6 is pushed through a suitable eyelet or throughgoing hole provided in the mat 3. The top part 1 is fixed to the mat 3 by a clamping member 16 which engages in a hole 18 in the extension 15. An internal rib 17 is provided in the hole 18 in the extension 15. The clamping member 16 is provided with a locking peg 19 having several circumferential external ribs 20 to provide the holding effect. In the embodiment illustrated here the thinnest possible mat has been clamped. If the mat is somewhat thicker, one of the other external ribs 20 of the locking peg 19 further toward the end of the locking peg 19 engages with the internal rib 17.

To hold the mat, the top part 1 is pressed with its coupling face 8 onto the coupling face 9 of the bottom part. The heads 11 of the coupling element 10 interlock so that a tension-absorbing bond is created between the top and bottom parts. To insure complete coincidence of the bottom part 4 during joining, the flange 6 of the top part 1 has a diameter which is larger than the diameter of the bottom part 4 by a ratio of 10:6.

The coupling face 9 of the bottom part 4 has a special arrangement of coupling elements 10. To facilitate engagement with the top part, the coupling elements 10 are arranged in pairs of substantially parallel lines. The two lines of coupling elements 10 in each pair of lines are spaced approximately a distance a apart. The distance a is approximately equal to the width of a pin head 11. The distance b between each pair of lines on the other hand is approximately equal to twice the width of a pin head 11.

The fixing element can be manufactured with its top and bottom part in an injection molding process. The pins which are used as the coupling elements, on the coupling faces are integrally molded during the injection molding process. In a separate step using a device optionally integrated in the injection-molding tool on a rotating plate, the heads 11 of the coupling elements 10 are formed with a heated forming punch. This produces very resistant, hook-like coupling elements which enable a coupling between the top and bottom part of the fixing element as a result of the coupling elements interlocking.

While the invention has been illustrated and embodied in a fixing element for a holding a mat, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Fixing element consisting of a bottom part anchorable to a mat support to which a mat is to be secured and a top part provided with a clamping device for securing the top part to the mat,
wherein said top part and said bottom part each have a disk-shaped flange with a coupling face and a plurality of identical pins projecting beyond the coupling face, each of said pins have a radially extending round head, and said coupling faces of said disk-shaped flanges face each other so that the identical pins on the opposing coupling faces cooperate by interlocking when the top part engages the bottom part to secure the mat to the mat support.

2. Fixing element as defined in claim 1, wherein the pins are arranged in pairs of substantially parallel lines, the lines in each of said pairs being spaced from each other approximately a distance equal to a width of one of the heads and each of said pairs of lines being spaced a distance equal to twice said width from an adjacent pair of said lines.

3. Fixing element as defined in claim 1, wherein the top and bottom parts are made from plastic material in an injection molding process and the heads of the pins are formed by a heated forming punch.

4. Fixing element as defined in claim 1, wherein said bottom part is provided with a shank having a thread, said thread having a pitch increasing towards said flange of said bottom part.

5. Fixing element as defined in claim 1, wherein said flange of said bottom part is provided with a centrally located hexagon socket.

6. Fixing element as defined inn claim 1, wherein the flange of the top part has a larger diameter than a diameter of the flange of the bottom part.

7. Fixing element as defined in claim 1, wherein the top part comprises a centrally arranged sleeve-like extension with a circumferential inner rib in the vicinity of an end thereof remote from the flange of the top part and the clamping device comprises a clamping member having a locking peg provided with external ribs dimensioned and located to engage the inner rib when the locking peg is inserted in the sleeve-like extension.

8. Fixing element consisting of a bottom part provided with a shank having a thread for anchoring said bottom part to a mat support to which a mat is to be secured, and a top part having a clamping device and securable to the mat via the clamping device,
wherein said top part and said bottom part each have a disk-shaped flange with a coupling face and a plurality of identical coupling elements, said thread having a pitch increasing towards said flange of said bottom part and said coupling faces of said disk-shaped flanges face each other so that the identical coupling elements on the opposing coupling faces cooperate by interlocking when the top Dart engages the bottom part to secure the mat to the mat support.

9. Fixing element consisting of a bottom part anchorable to a mat support to which a mat is to be secured and a top part having a clamping device and securable to the mat via the clamping device, said top part and said bottom part each having a disk-shaped flange with a coupling face and a plurality of identical coupling elements, said coupling faces of said disk-shaped flanges facing each other so that the identical coupling element on the opposing coupling faces cooperate b interlocking when the top part engages the bottom part to secure the mat to the mat support, wherein said flange of said bottom part is provided with a centrally located hexagon socket.

10. Fixing element consisting o a bottom part anchorable to a mat support to which a mat is to be secured and a top part having a clamping device and securable to the mat via the clamping device, said top part and said bottom part each having a disk-shaped flange with a coupling face and a plurality of identical coupling elements, said coupling faces of said disk-shaped flanges facing each other so that the identical coupling elements on the opposing coupling faces cooperate by interlocking when the tap part engages the bottom part to secure the mat to the mat support, wherein the flange of the top part has a larger diameter than a diameter of the flange of the bottom part.

11. Fixing element consisting of a bottom part anchorable to a mat support to which a mat is to be secured and a top part having a clamping device and securable to the mat via the clamping device said ten art and said bottom part each having a disk-shaped flange with a coupling face and a plurality of identical coupling elements, said coupling faces of said disk-shaped flanges facing each other so that the identical coupling elements on the opposing coupling faces cooperate by interlocking when the top part engages the bottom part to secure the mat to the mat support, wherein the top part comprises a centrally arranged sleeve-like extension with a circumferential inner rib in the vicinity of an end thereof remote from the flange of the top part and the clamping device comprises a clamping member having a locking peg provided with external ribs dimensioned and located engage the inner rib when the locking peg is inserted in the sleeve-like extension.

* * * * *